Sept. 25, 1951   W. O. BENNETT, JR   2,568,981
COMPARATOR GAUGE
Filed Feb. 19, 1946
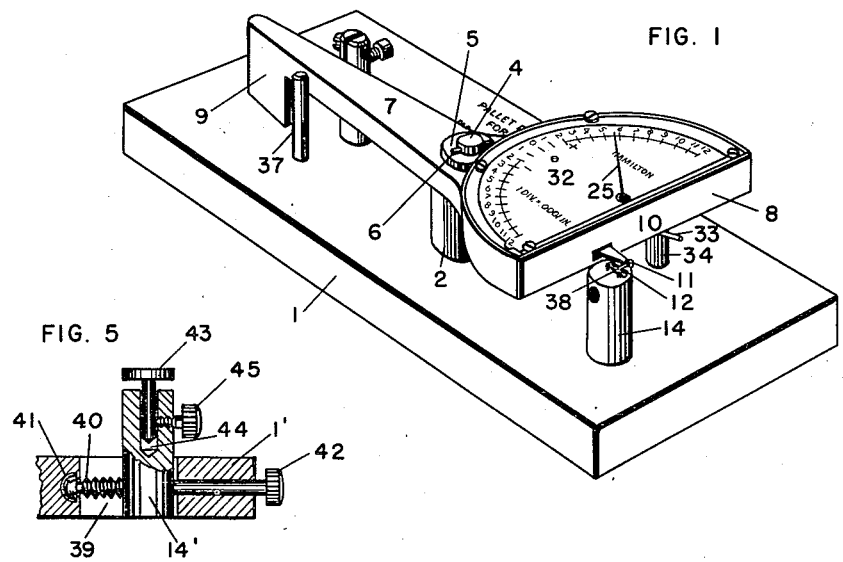
FIG. 1
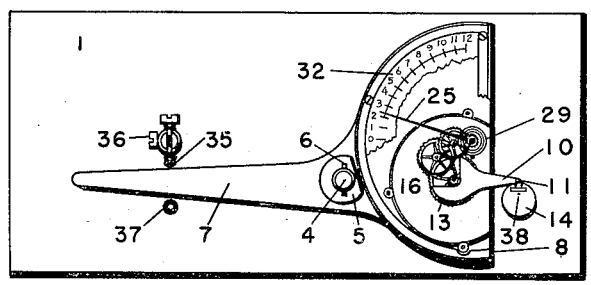
FIG. 5
FIG. 2
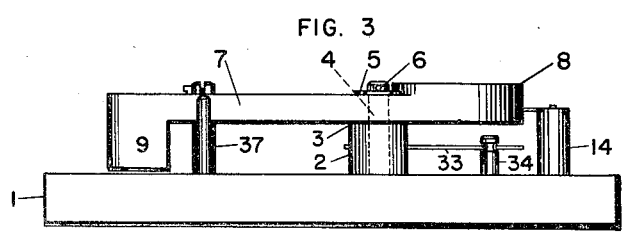
FIG. 3
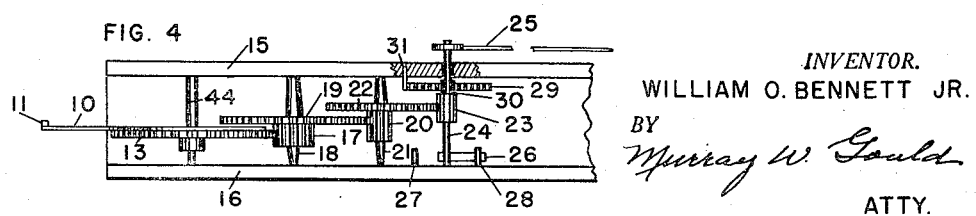
FIG. 4
*INVENTOR.*
WILLIAM O. BENNETT JR.
BY Murray W. Gould
ATTY.

Patented Sept. 25, 1951

2,568,981

UNITED STATES PATENT OFFICE 2,568,981

COMPARATOR GAUGE

William Ogle Bennett, Jr., Lancaster, Pa., assignor to Hamilton Watch Company, Lancaster, Pa.

Application February 19, 1946, Serial No. 648,609

1 Claim. (Cl. 33—148)

This invention relates to a comparison gage for measuring or determining the accuracy of small parts.

The object of the invention is to provide a gage which will accurately measure small watch parts to determine the departure from a standard.

The primary object of the invention is to provide an extremely sensitive comparison gage in which the contacting arm is limited to a small travel relative to the multiplying mechanism.

A further object is to provide an extremely sensitive comparison gage having an arm for contacting the part to be measured, the body of the gage being pivoted to swing within desired limits and to bring the arm into contact with the part to be measured, said arm being extremely limited in its own movement, the measuring being only effective within the limits of movement of the arm, the movement of the gage supplying the means for opening and closing the gage beyond the limits of movement of the contacting arm itself.

A further object of the invention is to provide a contacting arm having itself a relatively small travel but in conjunction with the body of the gage swinging through a large arc.

A further object of the invention is to provide a gage which will quickly and easily measure a small part to within a fraction of one ten-thousandth of an inch and will show such measurement on a greatly magnified scale.

A further object of the present invention is to provide a measuring gage in which the magnification of the measurement is made through a set of gears.

A still further object of the present invention is to provide a gage having a series of gears for magnification of the measurement, and means serving to keep the measurements within certain limits and a resilient means for eliminating the effects of back lash between the gears.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is shown in the accompanying drawings in which:

Figure 1 is a perspective view of the gage carrying the part in measuring position.

Figure 2 is a top plan view of the gage with a small part of the scale and top plate broken away.

Figure 3 is a side elevation of the gage.

Figure 4 is an extended detail view of the means for increasing the measurement, showing the gear train in a horizontal line rather than arranged as shown in Figure 2.

Figure 5 is a modified showing of the post for holding the part to be measured.

Referring in detail to the drawings, the gage is mounted on a base 1 by means of a central post 2 having a shoulder 3 and a reduced portion 4 passing through the gage. A washer 5 and pin 6 serve to hold the gage securely in position.

The gage is formed with a body portion having an extended arm 7 and a housing 8, the arm moving between limits to provide the necessary play in the gage and the housing furnishing support for the measure multiplying gears, as well as the scale and indicating hand. The free end of the arm is formed with an enlarged portion 9 to provide a broad bearing surface to be engaged by the fingers of the operator.

Extending from the housing is a contact arm 10 having a contacting pin 11 at its outer end. This arm, through its contacting pin, is brought into engagement with the part to be measured, in this instance shown as a pallet fork 12, the arbor hole of which fits over a pin 38 on the post 14. The distance between this pin 38 and the point of contact between the contact pin 11 and the pallet fork is measured. The instrument is set so that the scale reading should be zero provided the part to be measured is absolutely of the correct dimensions. The arm 10 is securely fastened to a gear 13 which is carried by a shaft 44 journalled in upper and lower plates 15 and 16. Connected to the gear 13 is a pinion 17 supported on shaft 18 which carries a gear 19, said shaft likewise being journalled in upper and lower plates 15 and 16. The gear 19 in turn engages the pinion 20 carried on the shaft 21, which shaft carries gear 22. This shaft is also journalled in upper and lower plates 15 and 16. Shaft 24 supports a pointer 25 which swings through an arc of 180 degrees limited in its motion by the arm 26 fastened to the shaft 24 and engaging pins 27 and 28. A hairspring 29 collected to the shaft 24 at 30 and secured to the upper plate 15 at 31 applies a constant torque to the gear train and eliminates the effect of any back lash, thereby rendering the reading extremely accurate. This torque multiplied through the gears constantly urges the arm 10 in a clockwise direction (Figure 2), thus supplying the correct gaging pressure. Carried directly above the upper plate 15 is a scale 32 having a zero reading and plus or minus readings on each side of the zero reading. In the present instance, these divisions correspond to one ten-thousandth of an inch so that the divergence from standard on the part being measured can be quickly and easily determined.

A spring 33 secured to the gage engages the post 34 and constantly urges the handle end of the gage against an adjusting tangent screw 35, which is adjusted for a zero reading and locked by a clamping screw 36.

Referring to Figure 5 which shows a modified form of the supporting post 14, the drawing illustrates a base 1' having a slot 39 in which is slidably mounted a post 14'. Movement of the post is controlled through a screw member 40 universally journalled at 41 in the base 1' and controlled by a knurled hand knob 42. In this manner, the post 14' is adjusted transversely of the base 1 to permit the handling of different size parts. An adjustable top 43 slidable in a hole 44 and held in position by set screw 45 provides vertical adjustment for the part, should this be desired.

In operation, the worker engages the handle end 9 of the gage moving it in a counter-clockwise direction and into engagement with the stop 37. While in this position, a part such as the pallet fork 12 is placed so that its center opening fits over the pin 38 on the post 14. Release of the handle end 9 brings the contact pin 11 into engagement with the end of the pallet fork, the gage pivoting until arm 7 meets tangent screw 35 through action of spring 33. The divergence from a zero reading to which the instrument has been set is then easily determined by looking at the gage.

What is claimed is:

A comparator gage for measuring small parts, comprising a base, a stationary post on said base for supporting a workpiece to be measured, a second post on said base, a lever pivotally mounted on said second post, said lever having one end in the form of a semi-circle, a gear train at and within the confines of said semi-circular end, an arm pivotally mounted and projecting beyond said semi-circular end, said arm being operatively connected to said gear train, a semi-circular dial carried by the semi-circular end of said lever, a pointer connected to said gear train and translating the movement of said gear train to indicia carried by said dial, adjustable means for limiting the movement of said lever, said arm being mounted to contact said workpiece during the last portion of the pivotal movement of said lever to measure that portion of the movement of said lever.

WILLIAM OGLE BENNETT, Jr.

REFERENCES CITED

The following references are of record in the file of this patent:

UNITED STATES PATENTS

| Number | Name | Date |
| --- | --- | --- |
| 1,274,331 | Rockwell | July 30, 1918 |
| 1,305,701 | Douglass | June 3, 1919 |
| 1,324,870 | Zito | Dec. 16, 1919 |
| 1,422,161 | Woodrow | July 11, 1922 |
| 1,445,482 | Bull | Feb. 13, 1923 |
| 1,459,500 | Cady | June 19, 1923 |
| 1,485,365 | Bradbury | Mar. 4, 1924 |
| 1,488,818 | Johansson et al. | Apr. 1, 1924 |
| 1,561,630 | Wilson | Nov. 17, 1925 |
| 1,874,677 | Wetmore | Aug. 30, 1932 |
| 1,994,833 | Plitt | Mar. 19, 1935 |
| 2,171,022 | Brown | Aug. 29, 1939 |
| 2,244,377 | Storm | June 3, 1941 |
| 2,267,583 | Carroll | Dec. 23, 1941 |
| 2,427,152 | Moore | Sept. 9, 1947 |